United States Patent Office 2,902,518
Patented Sept. 1, 1959

2,902,518

HYDROXYALKYL DI-ETHERS OF 2,2'-ISOPROPYL-IDENE-BIS-(2,6-DICHLOROPHENOL)

Everett C. Hurdis, Clifton, and John F. Petras, Glen Rock, N.J., assignors to United States Rubber Company, New York, N.Y., a corporation of New Jersey No Drawing. Application November 16, 1956
Serial No. 622,548

3 Claims. (Cl. 260—613)

This invention relates to new compositions of matter denoted 2,2' - [isopropylidenebis(2,6 - dichloro - p-phenyleneoxy)]dialkanols represented by the structure:

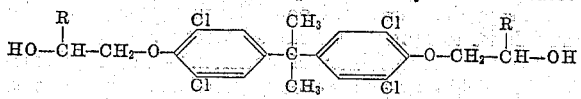

where R is either hydrogen or an alkyl group of 1 to 4 carbon atoms.

These new compounds, because of their unusual structural characteristics, are of value as components of unsaturated polymerizable polyester type resins. Specifically, when any one of these new compounds is reacted with substantially a stoichiometrically equivalent quantity of unsaturated dicarboxylic acid or anhydride, such as maleic, fumaric, itaconic, or citraconic acid or anhydride, a polyester resin results which can be copolymerized with various reactive ethylenic monomers such as styrene to give clear, hard useful plastics. These plastics have a novel slow-burning characteristic, which is entirely due to their content of one of the new compounds of this invention.

The new compounds of this invention are obtainable in good yields from 4,4'-isopropylidenebis(2,6-dichlorophenol) by reaction either with an appropriate alpha-olefin oxide or with an alpha-olefin chlorohydrin. Thus, from ethylene oxide or chlorohydrin, 2,2'-[isopropylidenebis-(2,6 - dichloro - p - phenyleneoxy)]diethanol is obtained; while from propylene oxide or chlorohydrin, 2,2' - [isopropylidenebis(2,6 - dichloro - p - phenyleneoxy)]dipropanol is obtained. Under similar reaction conditions, from the oxides or chlorohydrins of butene-1, pentene-1, and hexene-1 there are obtained, respectively, 2,2' - [isopropylidenebis(2,6 - dichloro - p - phenyleneoxy)]dibutanol, 2,2' - [isopropylidenebis(2,6 - dichloro-p - phenyleneoxy)]dipentanol, and 2,2' - [isopropylidenebis(2,6 - dichloro - p - phenyleneoxy)]dihexanol.

The following examples illustrate the invention, parts being by weight:

EXAMPLE 1

This example demonstrates (1) preparation of 4,4'-isopropylidenebis(2,6-dichlorophenol), and (2) preparation of 2,2' - [isopropylidenebis(2,6 - dichloro - p - phenyleneoxy)]diethanol therefrom.

(1) A reaction flask of 12 liters capacity, equipped with mechanical stirrer, dropping funnel and reflux condenser was charged with the following:

4,4' - isopropylidenediphenol ("Bisphenol A")
  M.P. 160° C.–162° C., 3 mols _____ g__ 684
Acetic acid, glacial _____ ml__ 3420

The mixture was heated to 40° C., and then 1701 g. sulfuryl chloride (12.8 mols) was added slowly through a dropping funnel, adjusting the rate of addition to keep the pot temperature below 60° C. The sulfur dioxide and hydrogen chloride evolved were disposed of by a simple scrubber. After all sulfuryl chloride was added, the mixture was heated to 114° C. to assure complete reaction. To obtain the product in crystalline form, the mixture was cooled to 60° C. and 6 liters of cold water run in with stirring. The crude crystalline 4,4'-isopropylidenebis(2,6-dichlorophenol) thus obtained was filtered off and dried to give a yield of 975 g. (88.8%). Recrystallization of crude product from benzene, using 2.5 ml. benzene, per gram of material, gave 750 g. (68.3% yield) of pure 4,4'-isopropylidenebis(2,6-dichlorophenol) melting at 136–137° C.

Analysis

|  | Calculated | Observed |
|---|---|---|
| Hydroxyl number | 306 | 302 |
| Chlorine, percent | 38.8 | 38.3 |

(2) The tetrachlorinated bisphenol (4,4'-isopropylidenebis (2,6-dichlorophenol)) prepared as above was then reacted with ethylene oxide as follows:

A reaction flask of 2 liter capacity, equipped with mechanical stirrer, gas inlet tube and reflux condenser was charged with:

Isopropylidenebis(2,6-dichlorophenol), 2 mols __ g__ 732
Propylene glycol, used as solvent _____ ml__ 150
Benzyltrimethylammonium chloride, 60% aqueous
  solution _____ ml__ 32
50% sodium hydroxide solution _____ g__ 16

The charge was melted and kept at 105–115° C., while ethylene oxide was bubbled in. When the mixture had gained 170 grams in weight (theory 175 g.) the reaction was discontinued. The reaction mixture was then dissolved in 8 liters of hot methanol, and 4 liters of water were added to precipitate the product in crystalline form. By filtering and drying, 1398 g. of material melting at 112° C.–114° C. was obtained. By adding an additional 2 liters of water to the mother liquor a second fraction weighing 191 g. of M.P. 109° C.–112° C. was isolated. Total yield was 87.5%. The following analysis confirmed that the product was 2,2'-[isopropylidenebis(2,6-dichloro-p-phenyleneoxy)]diethanol.

Analysis

|  | Calculated | Observed |
|---|---|---|
| Molecular weight | 454 | 452 |
| Hydroxyl number | 247 | 247 |
| Chlorine, percent | 31.3 | 30.9 |

EXAMPLE 2

This example demonstrates preparation of the same 2,2' - [isopropylidenebis(2,6 - dichloro - p - phenyleneoxy)]diethanol by reacting 1 mol of 4,4'-isopropylidenebis(2,6-dichlorophenol) with 2 mols of ethylene chlorohydrin.

One-fourth mol (91.5 g.) of 4,4'-isopropylidenebis-(2,6-dichlorophenol), prepared by the method of Example 1, was dissolved in a solution of 40.5 g. sodium methylate (0.75 mol) in 200 ml. methanol. Ethylene chlorohydrin, 80.4 g. (1 mol), was then run in slowly with stirring. The mixture was finally heated under reflux until no longer alkaline. The reaction mixture was then poured into 1 liter of water. An oil formed which soon crystallized. The crude product was removed by filtration and recrystallized from 1500 ml. 67% methanol, to give a product of M.P. 109° C.–111° C. Yield was a total of 85.5 g. or 85% of theory.

EXAMPLE 3

This example demonstrates the preparation of 2,2'-

[isopropylidenebis(2,6 - dichloro - p - phenyleneoxy)]-dipropanol by reaction of 1 mol of 4,4'-isopropylidenebis-(2,6-dichlorophenol) with 2 mols of propylene oxide.

The following mixture was charged into a reaction flask equipped with thermometer, mechanical stirrer, and reflux condenser:

| | |
|---|---|
| 4,4' - isopropylidenebis(2,6 - dichlorophenol) M.P. 114° C.–117° C., 0.25 mol _____ g__ | 91.5 |
| Propylene oxide (0.54 mol) _____ g__ | 31.0 |
| Benzyltrimethylammonium hydroxide, 60% aqueous solution _____ ml__ | 8 |
| Sodium methylate _____ g__ | 1.1 |

The mixture was heated under reflux until the pot temperature rose to 100° C., whereupon 25 ml. of 2-propanol was added as a diluent, and refluxing continued. After a total reaction time of 8 hours, the pot temperature was 100° C. and the vapor temperature 80° C. Heating was the discontinued, and the reaction mixture was poured out and dissolved in 300 ml. of methanol. Pouring the methanol solution into water gave 110.5 g. of crystalline product melting at 79° C. to 82° C. (a yield of 92%). The formation of 2,2'-[isopropylidenebis(2,6-dichloro-p-phenyleneoxy)]-dipropanol was confirmed by determination of hydroxyl number: calculated 233; observed 225.

EXAMPLE 4

This example demonstrates the preparation of 2,2'-[isopropylidenebis(2,6 - dichloro - p - phenyleneoxy)]dipropanol by reacting 1 mol of 4,4'-isopropylidenebis(2,6-dichlorophenol) with 2 mols of propylene chlorohydrin.

To a solution of 17.3 g. sodium in 650 ml. of 90% ethanol was added 91.5 g. (0.25 mol) of 4,4'-isopropylidenebis(2,6-dichlorophenol). Heat was applied until solution was complete. The heat was then turned off while 106 g. of propylene chlorohydrin (1.125 mols) was added dropwise with constant, mechanical stirring. When the chlorohydrin addition was complete, the mixture was heated under reflux until no longer alkaline. The reaction mixture was then poured into water giving a white precipitate of crude product. The crude material was filtered off and recrystallized from aqueous methanol. Yield was 101 g. (83%) of material melting at 81° C.–83° C.

Preparation of a polyester resin: The following procedure illustrates the preparation of a copolymerizable polyester resin in accordance with typical known methods, from one of our new bisalkanols:

A 2000 ml. flask equipped with gas inlet tube and mechanical stirrer was charged with 900 g. (1.98 mols) of 2,2'-[isopropylidenebis(2,6-dichloro-p-phenyleneoxy)]-diethanol and 176 g. (1.8 mols) of maleic anhydride. The mixture was heated slowly under a nitrogen atmosphere, until the components melted to a homogeneous liquid (100–110° C.). An exothermic reaction then ensued, and heating was discontinued until the heat evolution moderated. The reaction mixture was then heated slowly, so that the temperature rose to 150° C. in about 1 hour. Heating was continued to raise the temperature by 10° C. per hour until it reached 190° C. The temperature was held at 190° C. until the acid number dropped to 60. Then vacuum was applied to lower the pressure inside the flask to 200 mm. of mercury. Heating under vacuum at 190° C. was continued until the acid number dropped below 50. The product was cooled to 100° C., and 0.2 g. of hydroquinone was added to insure storage stability.

The polyester as prepared above was copolymerizable with styrene, using peroxide catalyst. The copolymers, containing 30–60% of copolymerized styrene, are clear, hard resins, with a novel slow-burning characteristic which is due entirely to their content of the combined tetrachlorinated diol.

Having thus described our invention, what we claim and desire to protect by Letters Patent is:

1. As new compositions of matter, 2,2'-[isopropylidenebis(2,6-dichloro-p-phenyleneoxy)]dialkanols represented by the formula

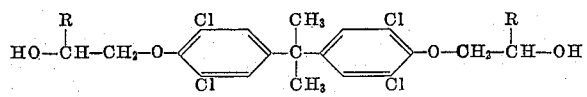

where R is selected from the group consisting of hydrogen, and alkyl radicals having from 1 to 4 carbon atoms.

2. 2,2' - [isopropylidenebis(2,6 - dichloro - p - phenyleneoxy)]diethanol represented by the formula

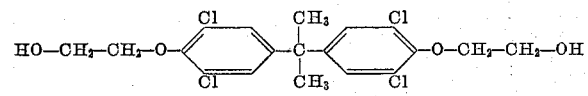

3. 2,2' - [isopropylidenebis(2,6 - dichloro - p - phenyleneoxy)]dipropanol represented by the formula

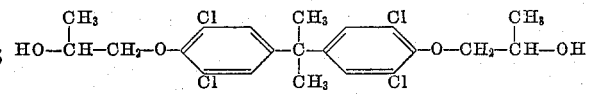

References Cited in the file of this patent

UNITED STATES PATENTS

| | | |
|---|---|---|
| 2,331,265 | Coleman et al. | Oct. 5, 1943 |
| 2,631,168 | Ross et al. | Mar. 10, 1953 |